ns
3,037,988
BENZOYLAMINOMETHYLPYRIDINES
Joseph Semb, Pearl River, and James R. Vaughan, Jr., New City, N.Y., and Selby B. Davis, Greenwich, Conn., assignors to American Cyanamid Company, New York, N.Y., a corporation of Maine
No Drawing. Filed Apr. 14, 1960, Ser. No. 22,090
6 Claims. (Cl. 260—295.5)

This invention relates to novel benzoylaminomethylpyridines which may be represented by the following general formula:

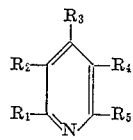

in which $R_1$ is hydrogen or lower alkyl, $R_2$ is hydrogen or amino, $R_3$ and $R_4$ are hydrogen, lower alkyl or tri-lower-alkoxybenzoylaminomethyl, one of which is tri-lower-alkoxybenzoylaminomethyl, and $R_5$ is hydrogen, amino or lower alkylamino. Suitable lower alkyl and lower alkoxy radicals contemplated by the present invention are those having from 1 to 4 carbon atoms.

The novel compounds are valuable hypotensive agents of low toxicity and may be administered orally or parenterally. When so administered, they have been found to be useful in amounts ranging from about 1 to about 50 milligrams per kilogram of body weight.

It is a novel feature of the present invention that the new compounds, while extremely potent hypotensive agents, do not function physiologically as do most of the commonly used hypotensive agents today such as pentolinium or mecamylamine, for example, which act as ganglionic blocking agents. It is not known with certainty the manner in which the new compounds function as hypotensive agents. It is a demonstrated fact, however, that the novel benzoylaminomethylpyridines have the ability to lower the blood pressure in mammals to a striking degree.

The new compounds are, in general, crystalline solids of limited solubility in water but relatively more soluble in such solvents as methanol, ethanol, propanol, 2-methoxyethanol, 2-ethoxyethanol, dimethylformamide, 1,4-dioxane, methyl acetate, ethyl acetate, acetic acid, dimethylsulfoxide, etc. The new compounds may be used as such but more preferably are used in the form of their non-toxic acid addition salts which may be readily prepared by treating the free bases with an acid such as hydrochloric, sulfuric, phosphoric, citric, tartaric or acetic acid, at a pH of between about 1 and 7.

The new compounds may be prepared by reacting an appropriate aminomethylpyridine with a suitable benzoyl halide according to the following equation:

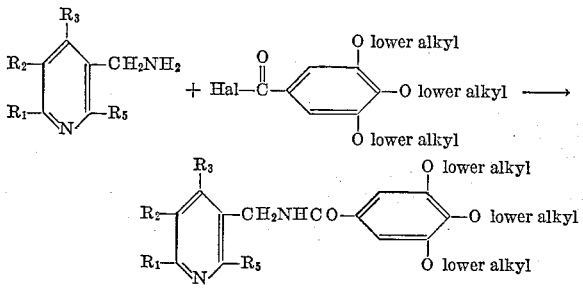

in which $R_1$, $R_2$, $R_3$ and $R_5$ have the meaning hereinbefore given and in which Hal represents bromine and chlorine.

The conditions of the reaction are not unduly critical and, in general, the reaction may be carried out at temperatures ranging from about $-10°$ C. to about $80°$ C.

The reaction is usually carried out in a solvent such as water, dimethylformamide, diethyleneglycol dimethyl ether, pyridine, diethyl ether, dioxane, tetrahydrofuran, and lower alcohols, or suitable combinations thereof, in the presence, when desirable, of an acid acceptor such as an alkali metal hydroxide or carbonate or a tertiary aliphatic amine.

The invention will be described in greater detail in conjunction with the following specific examples.

EXAMPLE 1

N-(2-Amino-6-Methyl-3-Pyridylmethyl)-3,4,5-Trimethoxybenzamide

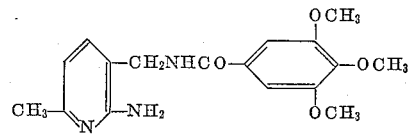

A mixture of 2.7 g. (0.02 mole) of 2-amino-6-methylnicotinonitrile, 100 milliliters of methanol, 10 milliliters of water and 4 milliliters of concentrated hydrochloric acid was shaken with hydrogen gas at atmospheric pressure in the presence of palladium (10% on charcoal). The catalyst was filtered off and the solvent removed by distillation yielding 3.3 g. of 2-amino-3-aminomethyl-6-methylpyridine dihydrochloride.

To a cold suspension of 2.1 g. (0.01 mole) of 2-amino-3-aminomethyl-6-methylpyridine dihydrochloride in 30 milliliters of diethyleneglycol dimethyl ether and 8 milliliters of 5 N NaOH was added dropwise, over a period of 10 minutes, a solution of 2.3 g. (0.01 mole) of 3,4,5-trimethoxybenzoyl chloride in 20 milliliters of diethyleneglycol dimethyl ether. The mixture was removed from the ice bath and stirred for 30 minutes and then diluted with 70 milliliters of water. A crop of long needles weighing 2.0 g., M.P. 177° was collected. A small portion was recrystallized from alcohol with no change in the melting point.

Analysis.—Calculated for $C_{17}H_{21}N_3O_4$: C, 61.6; H, 6.34; N, 12.7. Found: C, 61.3; H, 6.52; N, 13.0.

EXAMPLE 2

N-(5-Amino-4,6-Dimethyl-3-Pyridylmethyl)-3,4,5-Trimethoxybenzamide

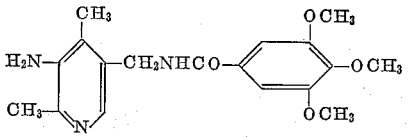

A 2.1 g. (0.01 mole) portion of 2-chloro-4,6-dimethyl-5-nitronicotinonitrile was reduced, in one step, to 5-amino-3-aminomethyl-4,6-dimethylpyridine following the procedure of Example 1. The product was isolated as the dihydrochloride monohydrate, yield 1.75 g. A 7.0 g. (0.03 mole) portion of 5-amino-3-aminomethyl-4,6-dimethylpyridine dihydrochloride monohydrate, the pooled product of several reductions, was treated with 3,4,5-trimethoxybenzoylchloride by the procedure of Example 1. The reaction mixture was diluted with 2 volumes of water, filtered and cooled in an ice bath. The crystalline precipitate obtained weighed 3.3 g., M.P. 222°.

*Analysis.*—Calculated for $C_{18}H_{23}N_3O_4$: C, 62.7; H, 6.67; N, 12.2. Found: C, 62.4; H, 6.91; N, 12.3.

EXAMPLE 3

*N-(2-n-Butylamino-6-Methyl-3-Pyridylmethyl)-3,4,5-Trimethoxybenzamide*

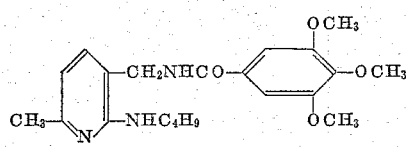

A mixture of 9.15 g. (0.06 mole) of 2-chloro-6-methylnicotinonitrile and 50 milliliters of n-butylamine was heated at reflux for 3 hours. The solution was cooled to room temperature and water was added to incipient cloudiness. Cooling in the refrigerator yielded a precipitate which was filtered off and redissolved in 100 milliliters of petroleum ether (B.P. 90–100°). The solution was treated with activated charcoal and dried over potassium carbonate. After concentration and cooling there was precipitated 6.8 g. of 2-n-butylamino-6-methylnicotinonitrile, M.P. 61°.

*Analysis.*—Calculated for $C_{11}H_{15}N_3$: C, 69.8; H, 7.92; N, 22.2. Found: C, 69.6; H, 7.99; N, 22.3.

A 4.6 g. (0.024 mole) portion of 2-n-butylamino-6-methylnicotinonitrile was reduced and the resulting 3-aminomethyl-2-n-butylamino-6-methylpyridine dihydrochloride was treated with 3,4,5-trimethoxybenzoyl chloride as in Example 1. On dilution with water a product weighing 6.0 g., M.P. 105°, was collected. Recrystallization from petroleum ether did not change the melting point.

*Analysis.*—Calculated for $C_{21}H_{29}N_3O_4$: N, 10.9. Found: N, 11.0.

EXAMPLE 4

*N-(6-Methyl-4-Pyridylmethyl)-3,4,5-Trimethoxybenzamide*

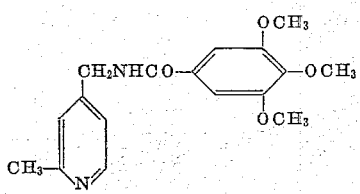

A 3.05 g. (0.02 mole) portion of 2-chloro-6-methylisonicotinonitrile was reduced and the resulting 4-aminomethyl-2-methylpyridine dihydrochloride was treated with 3,4,5-trimethoxybenzoylchloride by the procedure of Example 1. Ten milliliters of water was added to the reaction mixture and stirring was continued for 15 minutes. The mixture was then transferred to a distilling flask and most of the solvent was removed under reduced pressure. Forty milliliters of water was added to the residue yielding a waxy precipitate. On standing in the refrigerator overnight, the product solidified and was filtered off; weight 3.6 g., M.P. 129°. Recrystallization from ethyl acetate yielded a product weighing 2.3 g., M.P. 133°.

*Analysis.*—Calculated for $C_{17}H_{20}N_2O_4$: C, 64.6; H, 6.33; N, 8.86. Found: C, 64.4; H, 6.84; N, 9.24.

EXAMPLE 5

*N-(2-Methylamino-6-Methyl-3-Pyridylmethyl)-3,4,5-Trimethoxybenzamide*

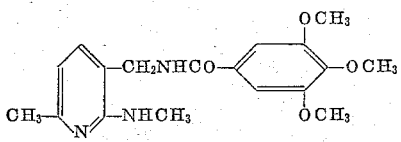

A 2.92 g. (0.02 mole) portion of 2-methylamino-6-methylnicotinonitrile was reduced and the resulting 3-aminomethyl - 2 - methylamino - 6 - methylpyridine dihydrochloride was treated with a solution of 3,4,5-trimethoxybenzoyl chloride by the procedure of Example 1. The reaction mixture was diluted with several volumes of water and extracted with 100 milliliters of methylene chloride. The methylene chloride phase was transferred to a distilling flask and the solvent removed under reduced pressure leaving a residue. The addition of several volumes of water yielded a gummy precipitate. Fifty milliliters of petroleum ether (90–100°) was then added and the mixture thoroughly stirred in an ice bath. The precipitate solidified and was filtered off, wt. 5.0 g., M.P. 140°. This was dissolved in dilute acetic acid, precipitated with dilute NaOH and then recrystallized twice from methanol-water yielding a product of M.P. 145°.

*Analysis.*—Calculated for $C_{18}H_{23}N_3O_4$: C, 62.6; H, 6.67; N, 12.2. Found: C, 62.3; H, 6.85; N, 12.4.

EXAMPLE 6

*N-(6-Methyl-3-Pyridylmethyl)-3,4,5-Trimethoxybenzamide*

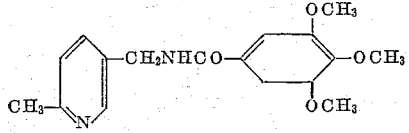

A 3.0 g. (0.02 mole) sample of 2-chloro-6-methylnicotinonitrile was reduced and the resulting 3-aminomethyl-6-methylpyridine dihydrochloride was treated with 3,4,5-trimethoxybenzoyl chloride by the procedure of Example 1. The reaction mixture was transferred to a distilling flask and most of the solvent removed under reduced pressure. To the residue was added 50 milliliters of water. An oil settled out which solidified on standing. The precipitate was removed and recrystallized from ethyl acetate. A product weighing 1.7 g. and melting at 153–154° was collected. Recrystallization from methanol-water did not alter the M.P.

*Analysis.*—Calculated for $C_{17}H_{20}N_2O_4$: C, 64.6; H, 6.33; N, 8.86. Found: C, 64.3; H, 6.00; N, 9.35.

EXAMPLE 7

*N-(2-Amino-3-Pyridylmethyl)-3,4,5-Trimethoxybenzamide*

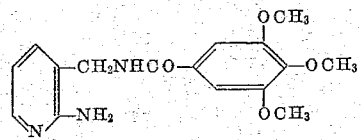

A 3.57 g. (0.03 mole) portion of 2-aminonicotinonitrile was reduced and the resulting 2-amino-3-aminomethylpyridine dihydrochloride was treated with 3,4,5-trimethoxybenzoyl chloride following the procedure of Example 1. Most of the solvent was removed from the reaction mixture under reduced pressure. The addition of 50 milliliters of water then yielded a precipitate. This was dissolved in 40 milliliters of hot alcohol and the solution was treated with activated charcoal. The addition of petroleum ether (90–100°) precipitated a product weighing 2.1 g. and melting at 195°.

*Analysis.*—Calculated for $C_{16}H_{19}N_3O_4$: C, 60.6; H, 6.04; N, 13.3. Found: C, 60.6; H, 6.36; N, 13.3.

EXAMPLE 8

*N-(4-Pyridylmethyl)-3,4,5-Trimethoxybenzamide*

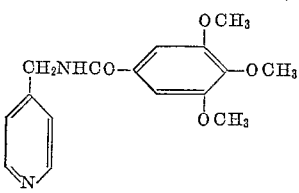

To a mixture of 6.84 g. (0.04 mole) of crude 4-aminomethylpyridine dihydrochloride, 15 milliliters of water, and 80 milliliters of diethyleneglycol dimethyl ether, cooled in an ice bath, was added 16 milliliters of 10 N NaOH. To this was added dropwise, over a period of 30 minutes, a solution of 8 g. (0.035 mole) of 3,4,5-trimethoxybenzoyl chloride in 25 milliliters of diethyleneglycol dimethyl ether. This was stirred for 30 minutes at room temperature and then diluted with 150 milliliters of water. On standing in the refrigerator overnight, a precipitate weighing 4.2 g. was collected. This was recrystallized from ethyl acetate. A product weighing 2.7 g., M.P. 165°, was collected.

*Analysis.*—Calculated for $C_{16}H_{18}N_2O_4$: C, 63.5; H, 6.00; N, 9.27. Found: C, 63.6, H, 6.17; N, 9.48.

EXAMPLE 9

*N-(3-Pyridylmethyl)-3,4,5-Trimethoxybenzamide*

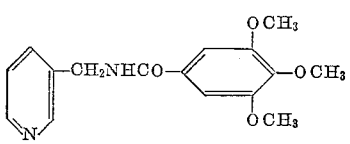

A 3.4 g. (0.02 mole) portion of crude 3-aminomethylpyridine dihydrochloride was treated with NaOH and 4.6 g. (0.02 mole) of 3,4,5-trimethoxybenzoyl chloride as in Example 8. Most of the solvent was removed under reduced pressure. On diluting the residue with water a precipitate was formed. This was recrystallized from ethyl acetate, and a product weighing 1.5 g., m.p. 143°, was collected.

*Analysis.*—Calculated for $C_{16}H_{18}N_2O_4$: C, 63.5; H, 6.00; N, 9.27. Found: C, 63.3; H, 6.28; N, 9.31.

EXAMPLE 10

*N-(2-Amino-6-Methyl-3-Pyridylmethyl)-3,4,5-Triethoxybenzamide*

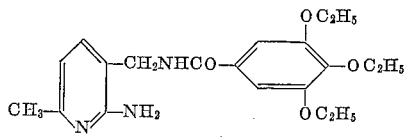

A 13 milliliter portion of 5 N NaOH was added to a suspension of 3.5 g. (0.°17 mole) of 2-amino-3-aminomethyl-6-methylpyridine dihydrochloride in 50 milliliters of diethyleneglycol dimethyl ether. A solution of 4.5 g. (0.017 g.) of 3,4,5,-triethoxybenzoyl chloride in 35 milliliters of diethyleneglycol dimethyl ether was added and the mixture was stirred for 30 minutes at room temperature. The addition of 200 milliliters of water yielded 5.0 g. of crystaline precipitate, M.P. 138–140°. Recrystallization from ethyl acetate raised the melting point to 142–143°.

*Analysis.*—Calculated for $C_{20}H_{27}N_3O_4$: C, 64.4; H, 7.29; N, 11.3. Found: C, 63.9; H, 7.21; N, 11.3.

We claim:
1. N - (2 - amino - 6-methyl-3-pyridylmethyl)-3,4,5-trimethoxybenzamide.
2. N - (5 - amino-4,6-dimethyl-3-pyridylmethyl)-3,4,5-trimethoxybenzamide.
3. N - (2 - methylamino-6-methyl-3-pyridylmethyl)-3,4,5-trimethoxybenzamide.
4. N - (2 - n-butylamino-6-methyl-3-pyridylmethyl)-3,4,5-trimethoxybenzamide.
5. N - (2 - amino - 3 - pyridylmethyl)-3,4,5-trimethoxybenzamide.
6. N - (2 - amino - 6 - methyl-3-pyridylmethyl)-3,4,5-triethoxybenzamide.

References Cited in the file of this patent
UNITED STATES PATENTS

| 2,554,186 | Goldberg et al. | May 22, 1951 |
| 2,870,156 | Perron et al. | Jan. 20, 1959 |